United States Patent [19]

Moyle et al.

[11] Patent Number: 5,260,120
[45] Date of Patent: Nov. 9, 1993

[54] TWO COAT WELDABLE PRIMER FOR STEEL

[75] Inventors: Richard T. Moyle, Pataskala; Karl P. Anderson, Columbus, both of Ohio

[73] Assignee: Morton International, Inc., Chicago, Ill.

[21] Appl. No.: 802,785

[22] Filed: Dec. 6, 1991

[51] Int. Cl.$^5$ .......................... B32B 15/04; B05D 7/00
[52] U.S. Cl. ..................................... 428/219; 427/218; 427/379; 427/409; 428/336; 428/457
[58] Field of Search ............... 428/457, 219, 336; 523/406; 427/409, 218, 379

[56] References Cited

U.S. PATENT DOCUMENTS 5,001,173  3/1991  Anderson et al. ................ 523/406

Primary Examiner—Thomas J. Herbert, Jr.
Attorney, Agent, or Firm—Robert M. Didrick; Gerald K. White

[57] ABSTRACT

A mar resistant, weldable zinc-coated metal substrate capable of sustaining the life of a copper-tipped electrode used in welding the substrate through a minimum of 2000 welds is achieved by applying a weldable primer coating composition to the metal, heating the primer composition to provide the desired dry coating, applying a protective coating composition over the primer coating in an amount sufficient to provide from about 50 to about 400 mg/ft$^2$ of a dry film, and heating the protective coating composition to produce the dry film. Without the resin-based protective coating, the weldable primer is easily marred. The resin-based protective coating, which is from about 0.06 mil to about 0.13 mil thick, improves the mar resistance of the primer and enhances the corrosion resistance of the zinc-coated steel without interfering with the weldability of the primer. The primer contains from about 30 to about 60% of ferrophosphorus and from 0 to about 30% by weight zinc powder. When zinc is present, the ratio of ferrophosphorus to zinc is from about 9:1 to about 1:1 by weight.

13 Claims, No Drawings

TWO COAT WELDABLE PRIMER FOR STEEL

This invention relates to the avoidance of deterioration of copper electrodes used in welding zinc-coated steel substrates. More particularly, it relates to a two coat weldable primer system wherein a weldable but easily marred first barrier coat is covered with a second, mar resistant coat which maintains the weldability of the system.

The welding of zinc-, zinc/nickel alloy-, and zinc/iron alloy-coated steels, which for the purposes of this invention include the various zinc-containing forms of galvanized steel, steel having a chrome conversion coating (with or without zinc therein) on its galvanized or ungalvanized surface, and steel having a zinc-rich or zinc/nickel alloy-rich primer on either of such surfaces, has been fraught with the problems of higher current and longer time requirements but, most of all, short electrode life. Copper tipped electrodes are degraded easily by the alloying of zinc on the substrate being welded. Under the high temperatures and high pressures of spot welding, such electrodes have been known to survive as many as 50,000 welds on uncoated steel but the problem with zinc-coated steel is so severe that the automotive industry and other sheet metal fabricators have insisted that such steel must sustain at least a 2000 weld life for the spot welding electrodes.

In U.S. Pat. No. 5,001,173, we and our colleagues disclosed weldable liquid primer compositions which are useful over the epoxy-based chrome conversion coatings also disclosed there as basecoats for the protection of metal against corrosion. These primer compositions may contain up to about 70% by weight of zinc powder or as much as 55% by weight of ferrophosphorus (see Primer Composition Example 3 of the '173 patent). In a paper presented at the SAE International Congress and Exposition at Detroit in 1988, and entitled "Weldability and Electrode Wear Characteristics of Hot-Dip Galvanized Steel With and Without a Ferrophos Containing Primer", Gould, Kimchi, and Campbell discussed the results of their use of primers containing as much as 50 percent by volume of ferrophosphorus (a mixture containing $Fe_2P$ and $FeP$). One of their findings was that the rate of electrode wear when welding unpainted hot-dipped galvanized steel was about three times what it was when the same steel having the ferrophos primer was welded.

The problem with ferrophos primers, however, is their appearance. Ferrophos is a very dark gray pigment and, at the high pigment/binder ratios necessary for a weldable primer, mar resistance is almost nil. Even fingernail scratches are highly visible despite the dead flat finish imparted by the pigment. The abrasiveness of such a texture raises a new problem—excessive die wear. Also, the added corrosion resistance afforded by zinc-rich primers is lost to the extent that ferrophos replaces the zinc.

SUMMARY OF THE INVENTION

Therefore, it is an object of this invention to provide mar resistance for a weldable primer on a steel substrate that permits the use of spot welding electrodes for more than 2000 welds of that substrate.

It is another object of this invention to provide corrosion resistance for a ferrophos-rich primer intended for steel substrates having little or no zinc coating.

It is a another object of this invention to provide a two coat weldable primer system having a high ferrophosphorus pigment loading which has an improved gloss and sheen, and therefore, lower abrasiveness than the raw, one coat primer.

A mar resistant, weldable zinc-coated metal substrate capable of sustaining the life of a copper-tipped electrode used in welding the substrate through a minimum of 2000 welds is achieved by applying a weldable primer coating composition to the metal, heating the primer composition to provide the desired dry coating, applying a protective coating composition over the primer coating in an amount sufficient to produce a film having a dry weight of from about 50 to about 400 $mg/ft^2$, and drying the protective coating.

DESCRIPTION OF THE PREFERRED EMBODIMENTS

The basic primer composition, i.e., without the conductive pigments, may be selected from among the commercially available primers. The liquid weldable primer composition may have a crosslinkable thermoplastic resin as the binder or a thermosetting resin as the binder and it may be primarily an aqueous composition or one in which an organic solvent is the principal one. It contains from about 30 to about 60% by weight of a conductive ferroalloy powder and from 0 to about 30% zinc powder but, when zinc powder is present, the ratio of ferroalloy powder to zinc powder is from about 9:1 to about 1:1 by weight. The pigment to binder ratio may be from about 3:1 to about 5:1; for optimum weldability it will be about 4:1 or more and preferably it is from about 4.5 to about 4.8. The conductive ferroalloy powder will sometimes be referred to hereinbelow as a conductive pigment. For purposes of calculating the pigment to binder ratio, the term pigment includes ferrophosphorus, zinc and other pigments or fillers. The zinc powder does not function as a conductive pigment in this invention. As is shown hereinbelow, the particle size of the zinc is reduced so that the particles are for the most part insulated from one another and the ferrophosphorus by the binder. The role of the zinc here is to provide corrosion resistance.

Ferroalloy powders include ferromanganese, ferromolybdenum, ferrosilicon, ferrochlorine, ferrovanadium, ferroboron, ferrophosphorus, iron carbide, etc. They are essentially unreactive with water, dilute acids, and dilute alkaline solutions. The preferred ferroalloy is ferrophosphorus and the ensuing description of the invention will be given in terms of said material. The mean particle size of the ferrophosphorus is from about 3 to about 5 microns.

The protective coating composition may, in like manner, be water-based or be dissolved in an organic solvent. The binder may be a polyester, alkyd, epoxy, urethane, acrylic, or even a natural resin such as shellac. The protective coating composition also may be pigmented or not and may be selected from among commercially available paints, varnishes, and the like. A clear polyester-based coating composition such as that sold by Morton International, Inc. under the trademark Polyceram 300 is an example. Even the composition described in the aforementioned U.S. Pat. No. 5,001,173 as a corrosion-resistant basecoat and which is sold by Morton under the First Coat trademark may be used as the protective coating composition for the purposes of this invention. It is preferred that the protective coating be fully repaintable with other primers and topcoats so that the two coat weldable primer system of this invention can provide the preprimed surface required by the automotive industry.

Among the resins which are useful as binders in the protective coating compositions are cross-linkable linear polyesters of aromatic dicarboxylic acids and alkylene glycols. Cycloaliphatic dicarboxylic acids and dihydric alcohols are also suitable reactants in the preparation of the polyesters. The polyesters may also be derived from mixtures of aromatic dicarbocylic acids, some of which are symmetrical, one or more acyclic dicarboxylic acids, one or more cycloaliphatic dicarboxylic acids, and one or more of the diols. Examples of the symmetrical aromatic acids include terephthalic acid, bibenzoic acid, ethylene bis-p-oxy benzoic acid, and 2,6-naphthalic acid. Unsymmetrical aromatic dicarboxylic acids which may be used along with the symmetrical ones are exemplified by o-phthalic and isophthalic acid. Hexahydrophthalic acid and alkyl hexahydrophthalic acid and their anhydrides wherein an alkyl group having up to about seven carbon atoms is bound to the cycloaliphatic ring are examples of the cycloaliphatic acids contemplated, along with 1,4-cyclohexanedicarboxylic acid.

The dihydric alcohols are represented by ethylene glycol, 1,2- and 1,3-propanediol, neopentyl glycol, 1,6-hexanediol, 1,4-cyclohexanedimethanol, and the like.

Examples of the acyclic dicarboxylic acids which may be incorporated into the polyesters along with the aromatic and cycloaliphatic acids include adipic acid pimelic acid, suberic acid, sebacic acid, azelaic acid, dodecane dioic acid, and the like.

In a preferred embodiment, the polyester is derived from a mixture of aromatic dibasic acids such as terephthalic and isophthalic acids with an alkylene glycol having from 2 to about 6 carbon atoms in the alkylene group. Examples of such glycols include ethylene glycol, trimethylene glycol, 1,4-butylene glycol and the like. In addition to the aromatic acid and the glycol, the reaction mixture preferably contains an acyclic dicarboxylic acid. The relative amounts of the aromatic and acyclic acids may be varied in order to obtain polyesters having particularly desirable characteristics. In general, the ratio of aromatic to acyclic acid will be from about 2:1 to about 1:2 but more often it will be about 1:1 on an equivalent weight basis. The ratio of dicarboxylic acid to dihydric alcohol may also be varied but the alcohol is generally present in excess; the ratio being from about 1:1 to about 1:2 on an equivalent weight basis.

The reaction between the dicarboxylic acid mixture and the dihydric alcohols is effected in the conventional manner at an elevated temperature and in the presence of catalysts. Tin catalysts are especially useful and may be exemplified by dibutyl tin oxide and dibutyl tin dilaurate. Antimony oxide may also be used as a catalyst. The polyesters and co-polyesters will generally have molecular weights of from about 5000 to about 50,000 and will have a hydroxyl number of from about 5 to about 15.

Acrylic and methacrylic polymers and copolymers are further examples of resins which may serve as the binder in the protective coating composition of this invention.

The following are examples of polyesters which can be utilized in the protective coating compositions as well as in the primer, as will seen hereinafter. Unless otherwise indicated, all parts are by weight and all temperatures are on the Centigrade scale.

POLYESTER EXAMPLE 1

Into a reaction vessel there is charged 387.6 parts (12.5 equivalents) of ethylene glycol, 228 parts (2.75 equivalents) of terephthalic acid, 117.6 parts (1.42 equivalents) of isophthalic acid, 396 parts (4.2 equivalents) of azelaic acid (Emerox 1144), and 0.42 part of antimony oxide. An inert atmosphere is maintained and the mixture is heated to 240° with stirring while holding the vapor temperature below 125°. A mixture of water and glycol (184 parts) is removed. When the batch temperature reaches 240°, the reactor is adapted for vacuum processing and the pressure is reduced to about 25 mm Hg over a period of 1.25 hours while raising the temperature to 250°. The reaction is terminated about 15 minutes after full vacuum is attained and the vacuum is broken with nitrogen. The molecular weight of the polyester prepared in this manner is about 35,000 and the polyester is further characterized as having a hydroxyl number of about 8.9 and a hydroxy to carboxy ratio of 1.06.

POLYESTER EXAMPLE 2

A reactor is charged with 17.08 parts of ethylene glycol, 35.31 parts of neopentyl glycol. 36.83 parts of terephthalic acid, 0.07 part of dibutyl tin octoate, and 0.13 part of triphenyl phosphite. The mixture is heated to 230° and an inert sparge is used. The exhaust temperature is maintained at or below 110° as the reaction mixture is heated. The temperature is maintained at 225°-230° until the acid number of the mixture is below 5. A vacuum of 3 mm Hg or less is maintained at a temperature of 250° for about 7.5 hours until the viscosity of the reactor contents is approximately L (at 40% in MEK). The reaction mixture is then cooled and recovered. The molecular weight of this polyester is about 17,500 and its hydroxyl number is about 8.

PROTECTIVE COATING COMPOSITION
EXAMPLE A

In a sand mill 14.19 parts of a 60% by weight solution in high boiling naptha of a polyester made from isophthalic acid, orthophthalic anhydride, neopentyl glycol, and adipic acid, having a molecular weight of 4000-5000 and a hydroxyl number of 130-140, 6.08 parts of dipropylene glycol monomethyl ether (DPME), 0.51 part of Cook's acrylic flow aid, 0.20 part of Aerosil 200 silica, and 32.43 parts of titanium dioxide were ground to 7½ NS. The mill was rinsed with 2.00 parts of the polyester and 2.02 parts of the DPME as the mixture was filtered. To the filtrate were added with moderate agitation 30.43 parts of the polyester, 5.78 parts of Resamine 741 curing agent, 2.02 parts of ethylhexyl alcohol, 2.02 parts of butanol, 0.30 part of the morpholine salt of paratoluene sulfonic acid, and 2.03 parts of the DPME. The viscosity was 28-32" #4 Zahn.

The extremely thin layer of the protective coating in this invention does not interfere with the weldability of the primer yet provides greatly improved mar resistance, extra corrosion resistance, it provides a less permeable surface, and it smoothes out the abrasiveness of the dead flat conductive primer. When dry, the protective coating is from about 0.01 mil to about 0.13 mil (0.25μ to 3.25μ), preferably from about 0.06 to about 0.10 mil thick. The preferred thicknesses correspond to coating weights of from about 200 to about 300 mg/ft$^2$. To achieve uniformly thin layers of the liquid protective coating composition such as are required here, the reverse roll coil coating technique may be used. The coating composition is taken from a reservoir by a steel pick-up roll, passed on to a transfer steel roll, and then a film of the desired thickness is taken up by a rubber applicator roll. The wet film thickness is measured by rolling wet film gauges touching each end of the applicator roll. The dry film thickness is measured with an X-ray spectrograph or by the weight-strip-weight method.

Among the thermosetting resins which are useful as the binder in the primer coating composition are the phenoplast and aminoplast resins such as those made by the condensation of formaldehyde with phenol, urea, or melamine and polyesters having more than two but preferably less than three functional hydroxyl or carboxyl groups. Resins in which the constituents are modified to promote flexibility are preferred.

In one embodiment, liquid coating compositions which are useful as weldable primer coatings comprise:
(A) from about 3 to about 20% by weight of at least one cross-linkable thermoplastic resin,
(B) from about 5 to about 60% by weight of at least one organic solvent,
(C) from about 0.5 to about 10% by weight of at least one cross-linking agent, and
(D) a conductive pigment as aforesaid; the pigment to binder ratio preferably being from about 4.5 to about 4.8.

These coating compositions may also contain one or more of the following components: flow control agents, suspending aids such as silica powder, phosphoric acid or an alkylated phosphoric acid, lubricants, adhesion promoters, etc.

A variety of crosslinkable thermoplastic resins, cross-linking agents, organic solvents, pigments, corrosion inhibitors, and adhesion promoters that may be utilized in the primer are described in U.S. Pat. No. 5,001,173, which is incorporated herein by reference.

More specifically, liquid weldable primer compositions having a bake temperature of up to about 500° F. and which provide flexible crack-resistant coatings on steel and on galvanized steel substrates comprise:

| Constituents | Concentration (wt %) |
| --- | --- |
| Polyester resin A* | 4.0–14.9 |
| Propylene glycol mono-methyl ether acetate | 2.1–11.3 |
| Aromatic solvent B** | 0–18.6 |
| Dibasic ester*** | 5.0–18.6 |
| Blocked aliphatic polyisocyanate | 0.0–10.0 |
| Silica powder | 0.1–1.0 |
| Ferrophosphorus | 30–60 |
| Organic lubricant | 0.5–1.5 |
| Zinc powder | 0–30 |

*Linear, saturated polyester having a molecular weight of about 14000–15000 and an OH number of about 8–10
**Boiling point about 350–410° F.
***Dimethyl ester of adipic, glutaric, and/or succinic acid (DBE)

The following are specific examples of the preparation of liquid weldable primer compositions useful in this invention. All parts are by weight unless otherwise indicated.

PRIMER COMPOSITION EXAMPLE 1

To a mixture of 7.02 parts of the resin of Polyester Example 2 and 1.08 parts of the resin of Polyester Example 1 in 9.45 parts of DBE solvent and 9.45 parts of Amsco G aromatic solvent the following components were added with agitation: 0.8 part of Epon 828 epoxy resin (molecular weight of 350–400 and an epoxide equivalent of about 175–210), 2.0 parts of Mobay 3175 blocked aliphatic disocyanate, 7.0 parts of DBE solvent, and 1.0 part of hexamethoxymethyl melamine. A mixture of 2.0 parts of the DBE solvent and 0.3 part of Aerosil 200 silica was then added with moderate agitation before 55 parts of ferrophosphorous (OxyChem; mean particle size=3.0) were added. Moderate agitation was continued for 2 to 3 minutes while 0.2 part of the morpholine salt of paratoluene sulfonic acid and a mixture of 0.5 part of butanol and 0.5 part of 85% phosphoric acid were added. The viscosity was adjusted to a 45–55" #4 signature Zahn with 3.7 parts of the DBE solvent. The pigment/binder ratio was 4.64. Agitation of the mixture after addition of the ferrophosphorus was minimized so as not to exceed a 5 NS grind.

This dark gray urethane primer is suitable for application on hot dip galvanized, electrogalvanized, and Galvanneal steel. Morton's First Coat or the Bonderite 1303 pretreatment is preferably applied before priming the metal. The primer is applied by reverse roller coating in a coil coating operation at a coverage weight of from about 1900 to about 3000 mg/ft$^2$ (20.5 to 32.3 g/m$^2$). The wet film thickness is about 0.66 to 0.93 mil. It is baked at about 343° C. (650° F.) for 45 minutes to a peak metal temperature of 480°–490° F. The dry film thickness is about 0.25 to 0.35 mil.

Bonderite 1303 treated HD galvanized steel panels were coated on both sides with this primer at a coating weight of 2500 mg/ft$^2$ (26.9 g/m$^2$) and with Protective Coating Composition A at a coating weight of 250 mg/ft$^2$ (2.69 g/m$^2$). The panel dimensions were 0.9×150×300 mm (0.035×5.9×11.8 inches). Pairs of panels were spot welded according to Ford Motor Company's test methods FLTM BA13-1 and BA13-3. The welding current was in the range of from 7.6 KA to 9.3 KA and the electrode force was 600 lbs. The electrode had not failed after 4000 spot welds.

PRIMER COMPOSITION EXAMPLE 2

To a container equipped with a Cowles mixer, there was added 13.76 parts of a 50% by weight solution of a linear, high molecular weight polyester made from isophthalic acid, terephthalic acid, neopentyl glycol, and ethylene glycol, and having an acid number less than 4, a hydroxyl number of 10–14, and a viscosity of Z to Z2; 0.84 part of the Epon 828 epoxy resin, 2.11 parts of the Mobay 3175 diisocyanate, 1.05 parts of the hexamethoxymethyl melamine, 2.84 parts of Morton's Adcote 1140 polyester, 11.39 parts of DBE solvent, 23.14 parts of zinc powder, and 1.0 part of an anti-settling aid. The mixture was dispersed to a value of 6½+ and then 0.21 part of the morpholine tosylate and 5.25 parts of a 10% solution of phosphoric acid in ethanol were added with moderate agitation before 34.59 parts of ferrophosphorus were added slowly. The viscosity was adjusted to 45–55"#4 Zahn by adding 3.81 parts of the DBE solvent with minimal agitation so as not to exceed a 5 NS grind. The pigment/binder ratio was 4.82.

The product of Primer Composition Example 2 is suitable for use on galvanized steel but its preferred use is on cold rolled steel pretreated with Bonderite 902 or its equivalent. The coating weight of this primer is within the same range as the dark gray primer of Primer Coating Composition Example 1. An electrode used in spot welding such coated steel survived 2000 spot welds but the coating is easily marred in normal handling. Application of a protective coating of this invention at 200–300 mg/ft$^2$ over the primer improves the mar resistance and corrosion resistance and still sustains the life of the electrode through 2000 welds.

PRIMER COMPOSITION EXAMPLE 3

The general procedure of Primer Composition Example 2 was repeated except that 5.5 parts of zinc powder and 49.5 parts of the ferrophosphorus was used. The corrosion resistance of cold rolled steel coated with this primer in which the ratio of ferrophosphorus to zinc is 90:10 is very much better than when the steel is coated with a primer in which the ratio is 1.5:1.

The subject matter claimed is:

1. A corrosion-resistant, mar-resistant, and weldable zinc-coated metal substrate capable of extending the life of a copper-tipped electrode used in welding the coated substrate to a minimum of 2000 welds, said coated substrate being obtained by applying a layer of a weldable primer coating composition to the metal, heating the layer to provide the desired dry coating, applying a protective coating composition over the primer coating in an amount sufficient to provide from about 50 to about 400 mg/ft$^2$ of a dry film, and heating the protective coating composition to provide the dry film.

2. The metal substrate of claim 1 wherein the zinc coating is a galvanically deposited coating and the zinc content of the primer is zero, and the primer coating composition comprises a binder, a solvent, and from about 50 to about 60% by weight ferrophosphorus as a conductive pigment, the pigment/binder ratio being from about 3:1 to about 5:1.

3. The metal substrate of claim 1 wherein the primer is the zinc coating, and comprises a binder, a solvent, from about 30 to about 60% by weight of ferrophosphorus as a conductive pigment and up to about 30% by weight of zinc powder, and the pigment/binder ratio is from about 3:1 to about 5:1, with the proviso that the ratio of ferrophosphorus to zinc is from about 9:1 to about 1:1 by weight.

4. The metal substrate of claim 1 wherein the dry film is from about 0.06 to about 0.1 mil thick.

5. The metal substrate of claim 1 wherein the primer coating composition comprises:
   (A) from about 3 to about 20% by weight of at least one thermoplastic resin as a binder,
   (B) from about 5 to about 60% by weight of at least one organic solvent,
   (C) from about 30 to about 60% by weight of ferrophosphorus,
   (D) from 0 to about 30% zinc powder, with the proviso that when zinc powder is present, the ratio of ferrophosphorus to zinc is from about 9:1 to about 1:1 by weight, and
   (E) from about 0.5 to about 10% by weight of a crosslinking agent for the thermoplastic resin, wherein the ferrophosphorus and zinc powder are pigments and the pigment/binder ratio is from about 3:1 to about 5:1.

6. The metal substrate of claim 1 wherein the zinc coating is a chromate conversion coating containing zinc.

7. A method for sustaining the life of a copper-tipped electrode employed in welding galvanized steel substrates through a minimum of 2000 welds, said method comprising:
   applying to the substrate a weldable primer coating composition comprising a binder, a solvent, and a pigment, at least a portion of said pigment being selected from the class consisting of ferrophosphorus and a mixture of ferrophosphorus and zinc powder wherein the ratio of ferrophosphorus to zinc is from about 9:1 to about 1:1, the pigment/binder ratio being from about 3:1 to about 5:1;
   heating the primer coating composition to provide a dry coating;
   applying a liquid protective coating composition over the dry primer in an amount sufficient to provide from about 50 to about 400 mg/ft$^2$ of a dry film; and
   heating the protective coating composition to produce the dry film.

8. The method of claim 7 wherein the weight of the dry film is from about 200 to about 300 mg/ft$^2$.

9. A method for sustaining the life of a copper-tipped electrode employed in the welding of cold rolled steel having a zinc-bearing chrome conversion coating on its surface through a minimum of 2000 welds, said method comprising applying over the conversion coating a weldable primer coating composition comprising a binder, a solvent, from about 30 to 60% by weight of solids of ferrophosphorus as a conductive pigment, and wherein the pigment/binder ratio is from about 3:1 to about 5:1; heating the primer coating composition to produce a dry coating, and applying a protective coating composition over the dry primer coating in an amount sufficient to provide from about 50 to about 400 mg/ft$^2$ of a dry film and drying the protective coating composition to produce the dry film.

10. The method of claim 9 wherein the weight of the dry film is from about 200 to about 300 mg/ft$^2$.

11. A method for sustaining the life of a copper-tipped electrode employed in the welding of cold rolled steel having a non-zinc-bearing chrome conversion coating on its surface through a minimum of 2000 welds, said method comprising applying over the conversion coating a weldable primer coating composition comprising a binder, a solvent, from about 30 to about 60% by weight of ferrophosphorus and up to about 30% by weight of zinc powder as pigments, wherein the ratio of ferrophosphorus to zinc is from about 9:1 to about 1:1 by weight, and wherein the pigment/binder ratio is from about 3:1 to about 5:1; heating the primer coating composition to produce a dry coating, and applying a protective coating composition over the dry primer coating in an amount sufficient to provide from about 50 to about 400 mg/ft$^2$ of a dry film and drying the protective coating composition to produce the dry film.

12. The method of claim 11 wherein the ratio of ferrophosphorus to zinc is 9:1.

13. The method of claim 11 wherein the weight of the dry film is from about 200 to about 300 mg/ft$^2$.

* * * * *